US012732483B2

(12) United States Patent
Nakamura et al.

(10) Patent No.: US 12,732,483 B2
(45) Date of Patent: Sep. 8, 2026

(54) INFORMATION PROCESSING SYSTEM, INFORMATION PROCESSING METHOD, AND SERVER FOR PROVIDING STATION-RELATED INFORMATION

(71) Applicant: Mitsubishi Electric Corporation, Tokyo (JP)

(72) Inventors: Daisuke Nakamura, Tokyo (JP); Kengo Ryu, Tokyo (JP); Masatoshi Tanaka, Tokyo (JP); Shusuke Sekino, Tokyo (JP); Azumi Shimada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/809,336

(22) Filed: Aug. 20, 2024

(65) Prior Publication Data

US 2024/0414127 A1 Dec. 12, 2024

Related U.S. Application Data

(63) Continuation of application No. PCT/JP2022/007811, filed on Feb. 25, 2022.

(51) Int. Cl.
*H04L 9/40* (2022.01)
*G06F 16/951* (2019.01)

(52) U.S. Cl.
CPC ........ *H04L 63/0245* (2013.01); *G06F 16/951* (2019.01)

(58) Field of Classification Search
CPC ............................ H04L 63/0245; G06F 16/29
See application file for complete search history.

(56) References Cited

U.S. PATENT DOCUMENTS 5,021,953 A * 6/1991 Webber ................ G06Q 10/025 705/6
8,799,799 B1 8/2014 Cervelli et al.
(Continued)

FOREIGN PATENT DOCUMENTS

CN 109543115 A 3/2019
CN 107391706 B 6/2020
(Continued)

OTHER PUBLICATIONS

Office Action issued in the corresponding Taiwan Patent Application No. 112105751 on Feb. 21, 2025, 16pp.
(Continued)

*Primary Examiner* — Hieu T Hoang
(74) *Attorney, Agent, or Firm* — XSENSUS LLP

(57) ABSTRACT

A server to output, when information of a station is received, traffic information including time information related to the station and facility information or event information related to the station or a periphery of the station, and a client device to output the information of the station to the server and present traffic information including received time information related to the station, and the facility information or the event information related to the station or the periphery of the station are included, and thus, the traffic information including the time information related to the station and the facility information or the event information related to the station or the periphery of the station can be presented.

20 Claims, 6 Drawing Sheets

(56) References Cited

U.S. PATENT DOCUMENTS

| | | | | |
|---|---|---|---|---|
| 2007/0226374 | A1* | 9/2007 | Quarterman | G06Q 30/02 709/250 |
| 2008/0249969 | A1* | 10/2008 | Tsui | H02J 7/32 706/46 |
| 2008/0256017 | A1 | 10/2008 | Murakami | |
| 2011/0302153 | A1* | 12/2011 | Meretakis | G06F 16/951 707/E17.014 |
| 2012/0030161 | A1 | 2/2012 | Kawai | |
| 2012/0173131 | A1* | 7/2012 | Brennan | G08G 5/56 701/120 |
| 2013/0046795 | A1* | 2/2013 | Borgerson | G06F 16/9024 707/E17.011 |
| 2013/0325557 | A1* | 12/2013 | Ricci | G06Q 30/0206 705/7.35 |
| 2014/0074951 | A1* | 3/2014 | Misir | H04L 12/1827 709/206 |
| 2014/0358603 | A1* | 12/2014 | Viger | G06Q 50/40 705/7.12 |
| 2015/0178742 | A1* | 6/2015 | Smith | G06Q 30/0201 705/7.29 |
| 2017/0161764 | A1* | 6/2017 | Zhang | H04W 4/12 |
| 2018/0039635 | A1* | 2/2018 | Hawkins | G06F 16/9537 |
| 2019/0005055 | A1* | 1/2019 | Andrew | G06F 16/9537 |
| 2019/0268083 | A1* | 8/2019 | Cho | H04W 4/23 |
| 2020/0034758 | A1* | 1/2020 | Byron | G06Q 10/063 |
| 2021/0011961 | A1* | 1/2021 | Guan | G06F 3/04842 |
| 2021/0342704 | A1 | 11/2021 | Pavlov | |
| 2022/0114226 | A1* | 4/2022 | Kang | G06F 16/29 |
| 2023/0351280 | A1* | 11/2023 | Malinofsky | G06Q 10/063118 |
| 2024/0011779 | A1* | 1/2024 | Fung | G08G 1/123 |

FOREIGN PATENT DOCUMENTS

| | | | | | |
|---|---|---|---|---|---|
| CN | 111506688 | A | | 8/2020 | |
| CN | 111159564 | B | | 12/2024 | |
| JP | 2003-058672 | A | | 2/2003 | |
| JP | 2004-005501 | A | | 1/2004 | |
| JP | 2004138569 | A | * | 5/2004 | |
| JP | 2004-322942 | A | | 11/2004 | |
| JP | 2008-262398 | A | | 10/2008 | |
| JP | 2021174358 | A | * | 11/2021 | |
| KR | 20150102137 | A | * | 9/2015 | G06Q 50/10 |
| KR | 10-2019-0076381 | A | | 7/2019 | |
| KR | 10-2021-0014998 | A | | 2/2021 | |
| KR | 20210014998 | A | * | 2/2021 | G06Q 50/12 |
| WO | 2010/026900 | A1 | | 3/2010 | |
| WO | 2020/061578 | A1 | | 3/2020 | |

OTHER PUBLICATIONS

Takeshi Fukagawa, “A Corse in App Comparison: For Anyone Confused About Which to Buy”, Dos/V Special, Apr. 1, 2004, vol. 9, No. 4, pp. 151-153 (18 pages including English Translation).

Standards Editiorial Dept, “Google Feer Services Quick Start Guide 2018”, Standards, Inc., Koken Sato, Jul. 31, 2018, pp. 54,63, ISBN:978-4-86636-293-9, pp. 54-63 (11 pages including English Translation).

International Search Report and Written Opinion mailed on May 31, 2022, received for PCT Application PCT/JP2022/007811, filed on Feb. 25, 2022, 11 pages including English Translation.

Notice of Reasons for Refusal mailed on Jan. 17, 2023, received for JP Application 2022-561028, 8 pages including English Translation.

Notice of Reasons for Refusal mailed on Jun. 13, 2023, received for JP Application 2022-561028, 8 pages including English Translation.

Notice of Reasons for Refusal mailed on Oct. 24, 2023, received for JP Application 2022-561028, 6 pages including English Translation.

Office Action issued Nov. 4, 2025 in Indian Patent Application No. 202447059824, 6 pages.

* cited by examiner

Client Device Side
Server Sidet
Present Reception Screen
S101
Receive Information of Input
S102
Is Request to Server Necessary?
S103
Yes
No
Present Information of Response
S104
Receive Information of Request
S105
Is Update of DB Necessary?
S106
Yes
No
Update DB in Accordance with Request Information
S107
Generate Information of Response
S108
Reply with Information of Response
S109

FIG. 5

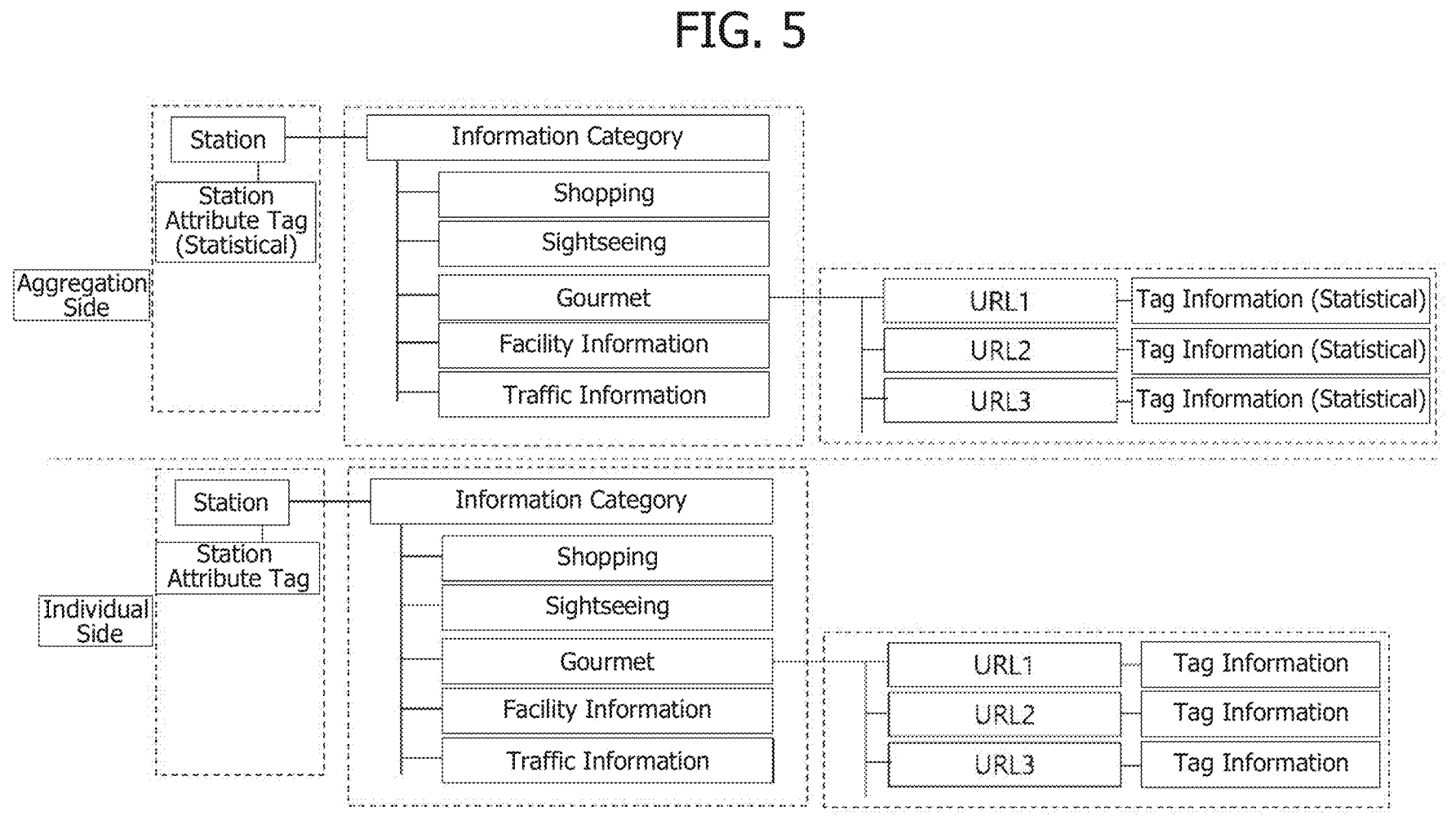

Aggregation Side

Station

Station Attribute Tag (Statistical)

Information Category

Shopping

Sightseeing

Gourmet

Facility Information

Traffic Information

URL1

URL2

URL3

Tag Information (Statistical)

Tag Information (Statistical)

Tag Information (Statistical)

Individual Side

Station

Station Attribute Tag

Information Category

Shopping

Sightseeing

Gourmet

Facility Information

Traffic Information

URL1

URL2

URL3

Tag Information

Tag Information

Tag Information

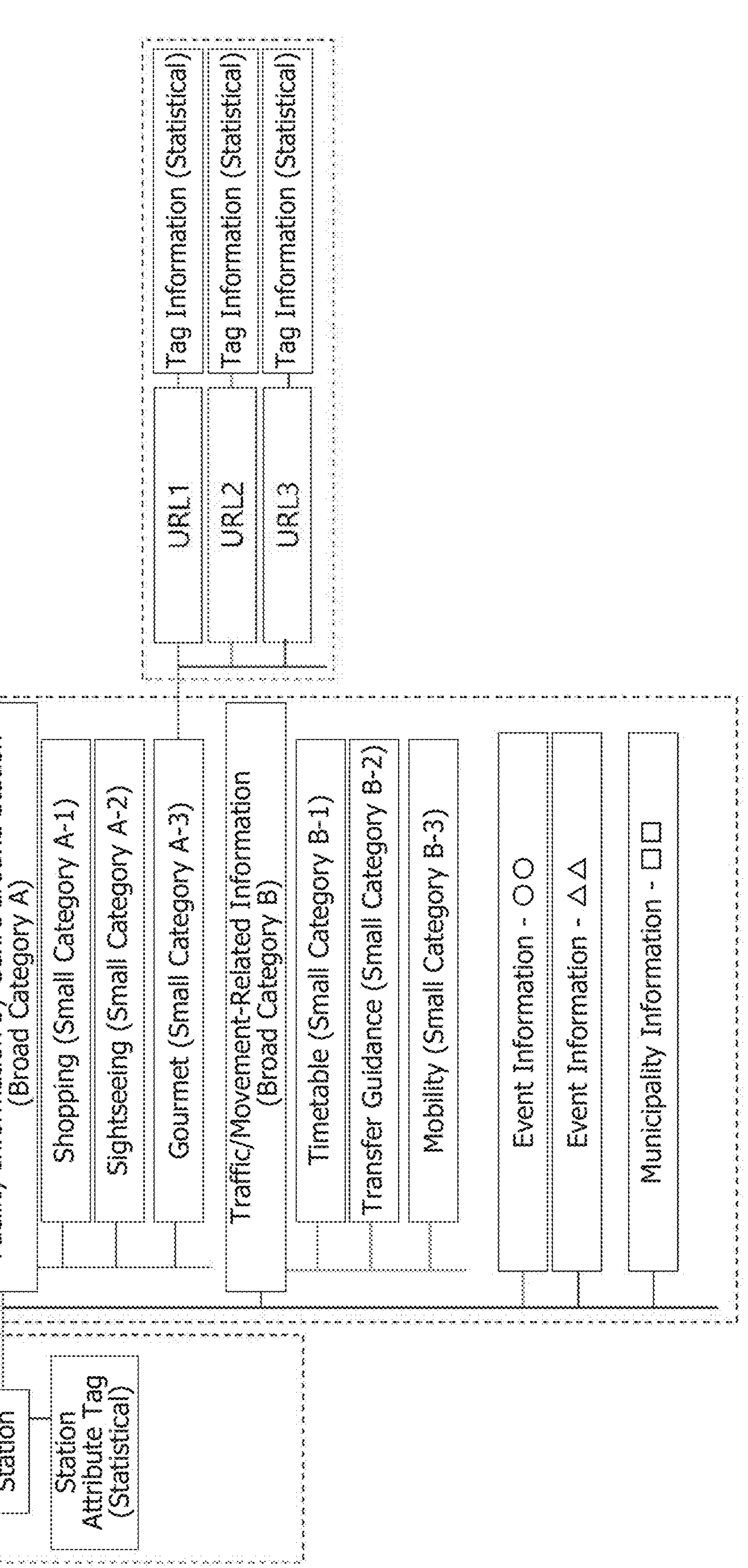
FIG. 6
Station
Station Attribute Tag (Statistical)
Facility Information by Genre around Station (Broad Category A)
Shopping (Small Category A-1)
Sightseeing (Small Category A-2)
Gourmet (Small Category A-3)
Traffic/Movement-Related Information (Broad Category B)
Timetable (Small Category B-1)
Transfer Guidance (Small Category B-2)
Mobility (Small Category B-3)
Event Information - ○○
Event Information - △△
Municipality Information - □□
URL1
URL2
URL3
Tag Information (Statistical)
Tag Information (Statistical)
Tag Information (Statistical)

INFORMATION PROCESSING SYSTEM, INFORMATION PROCESSING METHOD, AND SERVER FOR PROVIDING STATION-RELATED INFORMATION

CROSS-REFERENCE TO RELATED APPLICATION

The present application is a continuation of International Application No. PCT/JP2022/007811, filed Feb. 25, 2022, which is incorporated herein by reference in its entirety.

TECHNICAL FIELD

The present invention relates to an information processing system, an information processing method, and a server that present information in response to a request from a user.

BACKGROUND ART

There is disclosed a technique of extracting a plurality of nearest station candidates from current position information of a user, narrowing down the nearest station candidates by using route information and position information, creating a route connecting the nearest station finally obtained and a station where the user enters, acquiring a plurality of stations in a traveling direction, and presenting service information around the stations.

CITATION LIST

Patent Literature

Patent Literature 1: JP 2004-322942 A

SUMMARY OF INVENTION

Technical Problem

Although a technique for presenting service information around a nearest station or a plurality of stations obtained from current position information has been disclosed, there has been no tool capable of presenting, by searching for one station, traffic information including time information related to the station, and facility information and event information related to the station or a periphery of the station.

The present disclosure has been made to solve the above problems, and an object of the present disclosure is to present, by searching for one station, traffic information including time information related to the station, and facility information and event information related to the station or a periphery of the station.

Solution to Problem

An information processing system according to the present disclosure includes: a server to output, when information of a station is received, traffic information including time information related to the station and facility information or event information related to the station or a periphery of the station; and a client device to output the information of the station to the server and present the traffic information including received time information related to the station, and the facility information or the event information related to the station or the periphery of the station, wherein the server filters harmful or fake information included in automatically collected information through the facility information or the event information related to the station or the periphery of the station and extracts information evaluated in association with the facility information or the event information related to the station or the periphery of the station by a specific group including outsiders, and wherein when the client device presents information that satisfies a presentation request for the facility information or the event information related to the station or the periphery of the station, the server extracts information from among pieces of high-quality beneficial information evaluated to be equal to or more than a predetermined reference in a predetermined period among the evaluated information, the extracted information being evaluated to be equal to or more than the predetermined reference in a shorter period than the predetermined period, and the server excludes a candidate displayed in a past, determines a candidate different from the candidate presented in a previous request, and transmits the determined candidate to the client device.

Advantageous Effects of Invention

By the information processing system according to the present disclosure, when information of a station is received, traffic information including time information related to the station and facility information or event information related to the station or a periphery of the station can be presented.

BRIEF DESCRIPTION OF DRAWINGS

FIG. 5 is an example of a database structure in the first embodiment.

FIG. 6 is another example of the database structure in the first embodiment.

DESCRIPTION OF EMBODIMENTS

First Embodiment

Figure 1:
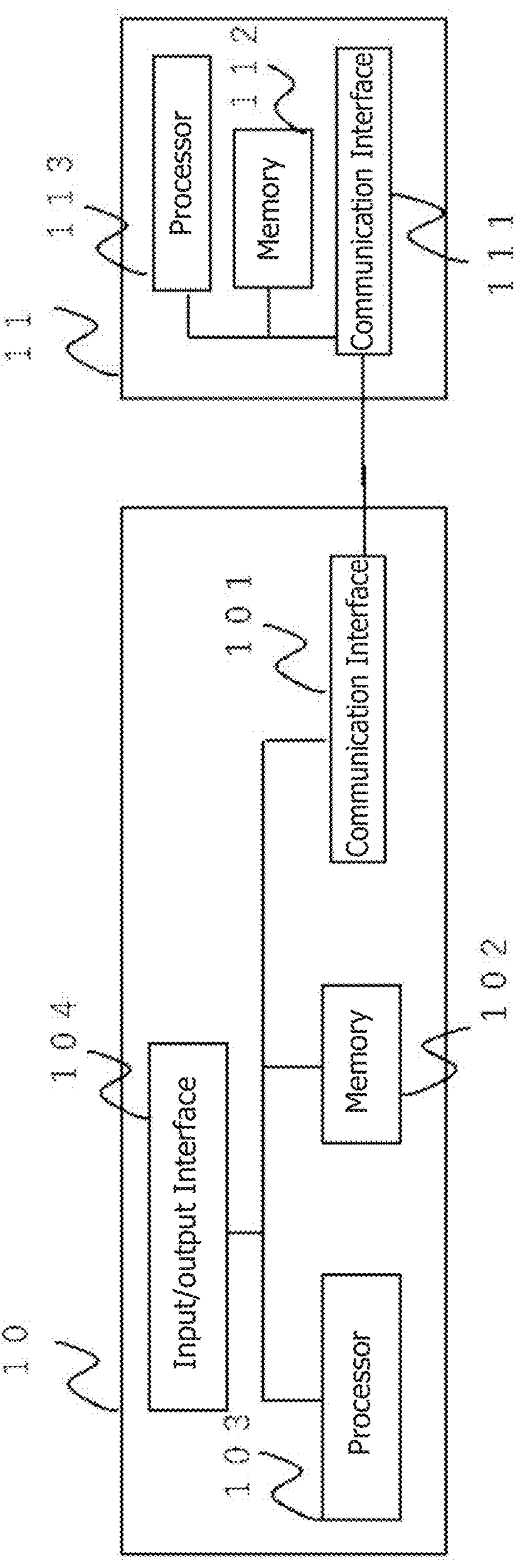
FIG. 1 is a hardware configuration diagram of an information processing system in a first embodiment.

FIG. 1 is a hardware configuration diagram of an information processing system in a first embodiment. The information processing system includes a client device 10 and a server 11 communicably connected thereto regardless of wired or wireless connection.

The client device 10 includes a communication interface 101 that is communicably connected to the server 11 regardless of wired or wireless and performs information communication, a memory 102 that stores a program of application and information for performing information communication with the server 11 via the communication interface 101, an input/output interface 104 that receives a request from a user and outputs information, represented by a touch panel, and a processor 103 that performs processing using information received by the input/output interface 104 and information in the memory 102. The input/output interface 104 is not limited to a touch panel, and devices such as a keyboard, a mouse, a camera, a gesture recognition device, a liquid crystal screen, a speaker, and a microphone may be integrated or may be configured separately. The client device 10 is assumed to be a PC, a smartphone, a car navigation system, a tablet terminal, a wearable terminal, a television, a signage terminal, an audio terminal that performs input and output by voice, or the like.

The server 11 includes a communication interface 111 that is communicably connected to the client device 10 regardless of wired or wireless and performs information communication, a memory 112 that stores a program of application and information for performing information communication with the client device 10 via the communication interface 111, and a processor 113 that performs processing using information in the memory 112. The server 11 is assumed to be a cloud service, an on-premises server, or the like arranged on the Internet. In addition, it is also assumed a case where the server 11 is installed together with the client device on a local network that is not connected to the Internet.

Next, an operation in an application service will be described.

The processor 103 of the client device 10 may output contents of content, acceptance of a request, and contents of an answer to the input/output interface 104 using software of a general-purpose browser stored in the memory 102, or may output contents of content, acceptance of a request, and contents of an answer to the input/output interface 104 using a dedicated application.

Figure 2:
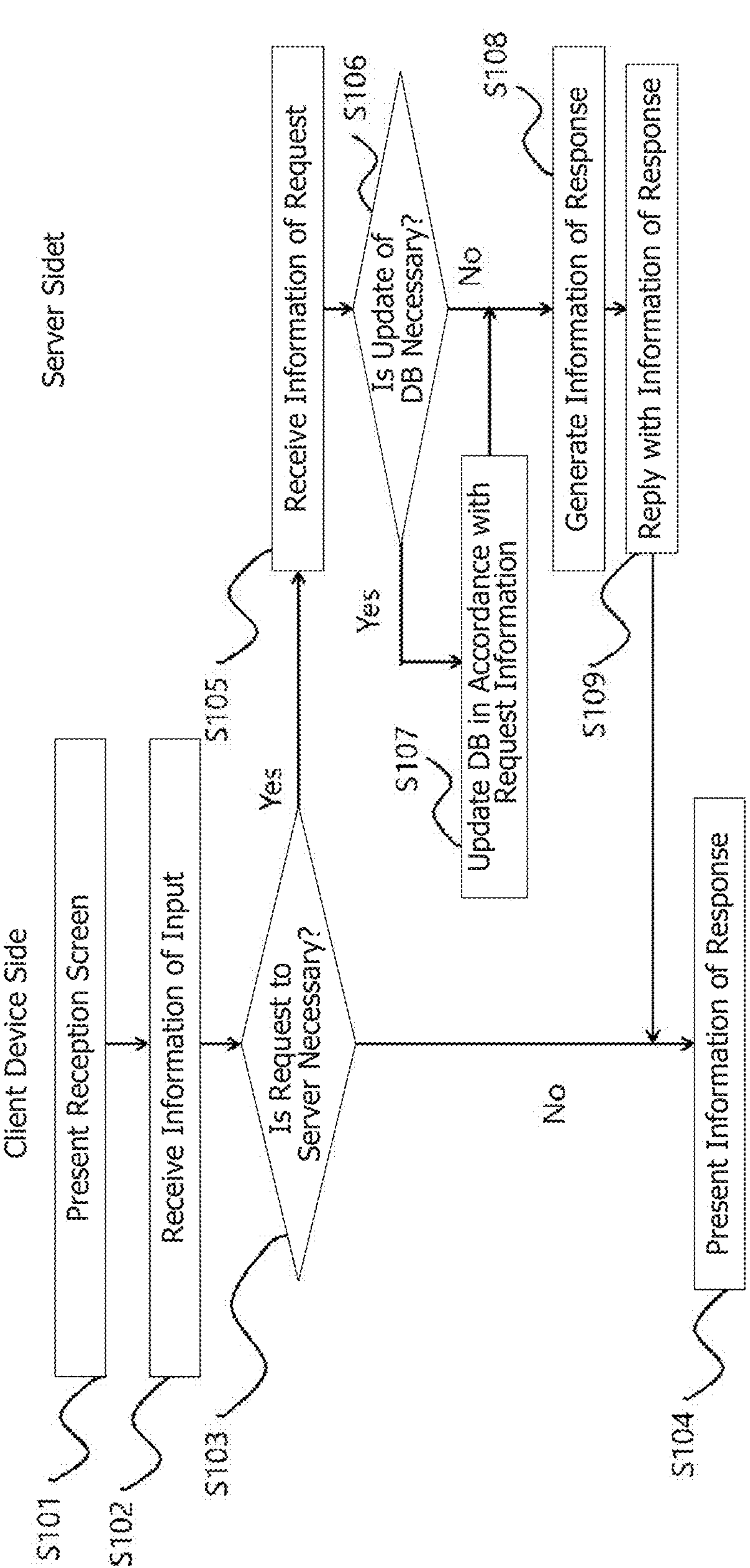
FIG. 2 is a flowchart illustrating a basic operation of the information processing system in the first embodiment.

FIG. 2 is a flowchart illustrating basic operation of the information processing system in the first embodiment.

In step S101, the processor 103 of the client device 10 displays a reception screen on the input/output interface 104. The reception screen is a display screen of a general-purpose browser, a dedicated application, or the like, and an input reception portion, a link to another URL, and a link to a transition destination screen are displayed depending on the content. In a case where the client device 10 is a voice terminal, input reception guidance and information regarding transition are guided by voice.

In step S102, the input/output interface 104 receives information of input.

In step S103, depending on the information of input, the processor 103 operates to output information of response to the input/output interface 104 if the response can be made using the information in the memory 102 (a request to the server 11 is unnecessary).

In step S104, the processor 103 causes the input/output interface 104 to output information of response in the memory 102.

In step S103, depending on the information of input, when it is determined that a response from the server 11 is necessary, the processor 103 causes the communication interface 101 to transmit information of request to the server 11.

In step S105, the communication interface 111 of the server 11 receives the information of request and stores the information of request in the memory 112.

In step S106, the processor 113 determines whether the information of request needs update of the information in a database (DB) stored in the memory 112 of the server 11. The process proceeds to step S108 when the update is unnecessary, and the process proceeds to step S107 when the update is necessary.

In step S107, the processor 113 of the server 11 updates the information in the database of the memory 112 in accordance with the information of the request. For example, it is used for updating a display specification of a general-purpose browser or a dedicated application mounted on the client device 10 managed by the server 11 side, updating information in the database (DB) using the client device 10, and the like.

In step S108, the processor 113 of the server 11 generates information of response by using the information of request stored in the memory 112 and stores the information of response in the memory 112.

In step S109, the processor 113 transmits the information of response stored in the memory 112 to the client device 10 using the communication interface 111, and causes the information of response to be stored in the memory 102 via the communication interface 101 of the client device 10.

In step S104, the processor 103 causes the input/output interface 104 to output the information of response transmitted from the server 11 in the memory 102.

Note that, as for the information of response, not only the information of response to the request but also a further input reception portion, a link to another URL, and a link to a transition destination screen may be displayed on a display screen of a general-purpose browser or a dedicated application. That is, the screen may also serve as a new reception screen together with the display of information of response. In this manner, steps S101 to S104 (including branching to steps S105 to S109) can be repeated. In a case where the client device 10 is a voice terminal, information of response is output by voice, and further input reception guidance and information regarding transition are guided by voice.

Next, contents of information input and output from the client device 10 will be described.

Hereinafter, when information related to presentation such as "information is presented", "display", "displayed", or "to display" is indicated, it includes both that information in the memory 102 included in the application service itself is appropriately processed by the processor 103 and displayed as an image or output as a sound through the input/output interface 104, and that the server 11 that has received a request from the client device 10 transmits response information to the client device 10 as a response to the request, and the client device 10 that has received the response information through the communication interface 101 and the memory 102 displays the response information as an image or outputs the response information as a sound to the input/output interface 104 via the processor 103 (it is assumed that steps S101 to S109 described in FIG. 2 are executed).

Next, an application service in which links to information regarding a station and surrounding streets are collected regardless of the information category based on the "station" will be described. This service is not intended for stations of a single railway company, but for stations in the whole world or nationwide (or multiple) railway companies in the country where the service is operated. Note that, in the present invention, the specification describes for "stations" such as railroad stations (including stations and stops of trams, monorails, cable cars, ropeways, and the like) as a representative use case, but as long as it is a key point in traffic that can be represented by a specific geographical "point" rather than a "surface", it may be a bus stop, a bus terminal, a road station, a service area, a motor pool, an airport, a port, a landmark of a sightseeing spot with a traffic terminal, or the like.

There are services that present information such as a timetable, transfer guidance, and a map as traffic information related to a station by a general-purpose browser or a dedicated application. In addition, there are also services that present information of facilities and stores of specific categories around the station, such as a service that presents a list of restaurants related to the station.

However, there has been no service that collectively presents traffic information including time information related to a station and facility information or event information related to a station or a periphery of the station on a per-station basis regardless of an information category. Hereinafter, an example of implementing the above will be described.

Hereinafter, an application service that collectively presents traffic information including time information related to a station and facility information and event information related to the station or a periphery of the station on a per-station basis regardless of an information category will be described.

Figure 3C:
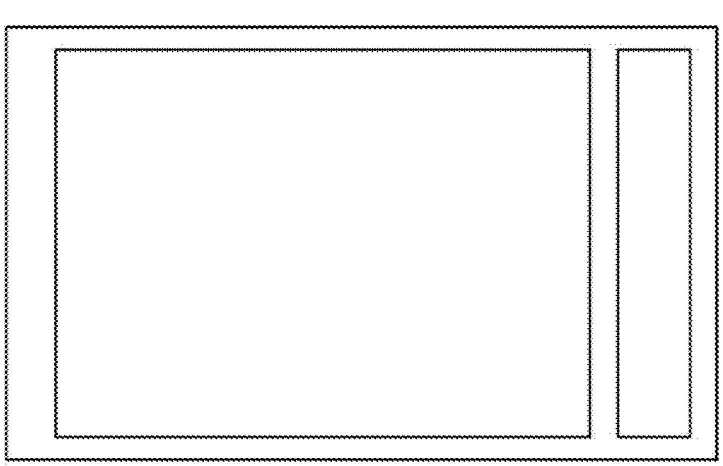
FIGS. 3A to 3C are examples of a screen displayed on a client device 10 in the first embodiment.
Figure 3B:
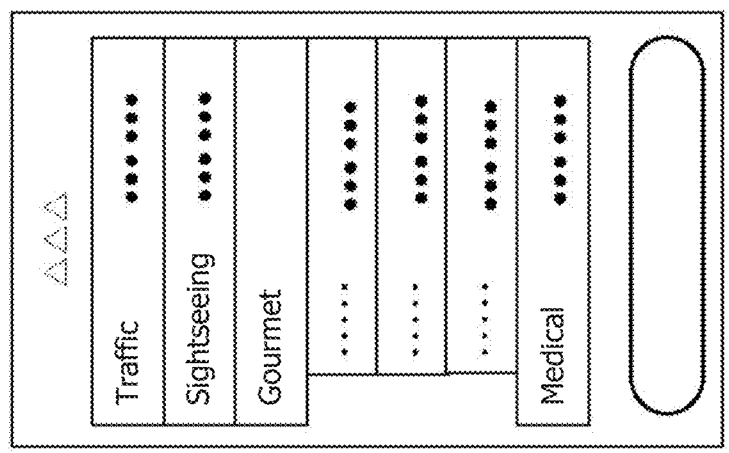
Figure 3A:
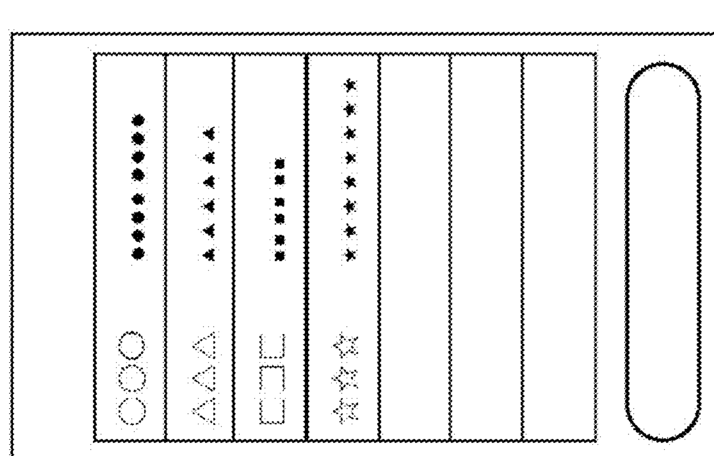

First, on a representative screen in an application service provided in the form of a general-purpose browser or a dedicated application, input guidance for searching for a station is presented, and a plurality of station candidates is simultaneously presented on the screen. FIG. 3A to 3C illustrate examples of a screen displayed on the client device 10 in the first embodiment, FIG. 3A is a display example of the representative screen in the application service, in which station names are displayed in characters on the left side (○○○, ΔΔΔ, and the like) of a frame of each level. The number of displays of the station in FIG. 3A is not limited to a range visible on the screen, and the number of displays can be increased by scrolling the screen up and down. A function of input for a character search is provided in a rounded frame on the lower side of FIG. 3A. Note that, as the plurality of station candidates displayed on the representative screen, all the stations recorded in the database (DB) stored in the memory 112 of the server 11 may be displayed when the screen is activated, or stations may be displayed randomly or on the basis of a certain rule by the information processing system from among the stations stored in the database (DB). When the user performs a search by inputting a character string into a rounded frame on the lower side of FIG. 3A, a station that completely matches or partially matches the character string for the first time may be extracted from the database (DB) and displayed. In addition, the representative screen may be an initial screen displayed immediately after the application service is activated, or may be provided as an individual function in an application service having a name such as "find station" different from the initial screen.

The plurality of displayed station candidates can be clipped on a per station basis in such a manner that the user can easily call the candidates later on the application service, and one or more positions of the station for the user can be assigned to the station as a station attribute tag (closest to home, closest to work, desired to visit someday, favorite, or the like). The clipped station can be centrally managed in a database (DB) stored in the memory 112 of the server 11 or the memory 102 that stores information of the application on the client device 10 side. The change in the information regarding the clipping and the station attribute tag is updated according to the flowchart of FIG. 2. That is, in addition to displaying a plurality of station candidates, in the present application service, it is possible to designate a station to be displayed by search or the like on the intention of the user side, and further, it is possible to clip one or more stations. Note that the list of clipped stations may be displayed by setting to narrow down and display only stations clipped on the representative screen, or a function of displaying a list of only stations clipped on a corner or screen different from the representative screen may be implemented.

For example, a station attribute tag (closest to home, closest to work, desired to visit someday, favorite, or the like) may be displayed in a small character portion on the right side of the frame of each level in FIG. 3A. When the application service is used, station attribute tags (closest to home, closest to work, desired to visit someday, favorite, or the like) are added to stations clipped by the user himself/herself, and all of one or more stations centrally managed by the application on the side of the server 11 or the client device 10 can be listed, or a function of arranging and displaying the clipped stations on the screen depending on a type order, a browsing history order, a selection number order of the station attribute tags, and the like can be included. In addition, a function capable of performing narrowing-down display the clipped stations by specifically designating the type of station attribute tag, the browsing period, and the number of times of selection of the station attribute tag may be provided. In addition, the station attribute tag may have a function of registering a relationship between a station and the user (for example, "nearest station from his/her alma mater") or a more specific position in life (for example, "station frequently used for shopping") as a new attribute, in a free character string. That is, it is possible to display the station depending on the condition preferred by the user. While there are many stations in the whole world and all over the country, the range of stations browsed by individuals is limited to some extent, and thus, setting to display only some stations by the clipping function can improve user convenience.

The stations to be presented in the list of stations on the representative screen may be displayed in descending order of the total number of accesses obtained by aggregating the access histories of all users who use the application service, or may be displayed as stations to which many pieces of high-quality beneficial information to be described later are associated. Furthermore, a station different from the station at the time of the previous activation of the application may be presented as a station to which high-quality beneficial information to be described later is associated. As a method of displaying a station different from the previous station, the station may be randomly displayed or a certain rule may be used.

In addition, in the case of the client device 10 capable of collecting the position information, the position information may be transmitted to the server 11, or by the function of the client device 10 itself, stations close to the position may be presented in order of proximity, for example, in a number within a range of one digit, and further, for example, popular stations may be presented in a number within a range of one digit from among stations within a distance or a required time that can be reached in about one hour by an existing railroad line or about two hours by the Shinkansen (such as a time calculated by the required time information of route search). Furthermore, in addition to the current position where the user is, presentation may be performed depending on the closeness of the distance from the clipped station, the closeness of the distance between the stations to be presented, or the number of accesses. That is, the station to be presented is determined in consideration of the distance between the closest station and another station according to the position information of the server 11 side and the required time required when a train is used.

In addition, although there is a function of inputting a character search in a rounded frame on the lower side in FIG. 3A, the same processing may be performed on the station retrieved here by replacing the case of the station closest to the above-described position information.

In the case of the client device 10 capable of collecting the position information, in order to improve the convenience of the user, a specification may be used in which a station near the current location appears immediately in order of proximity at starting up the application.

Furthermore, the station may be selected and presented according to a past search history or selection history of the user who uses stations. Furthermore, a station desired to be guided by a company, a municipality, or the like that provides information or funds to the application service may be presented in a part of the selective display. A picture of a scenery of a sightseeing spot around the station or a dish of a restaurant around the station may be presented together with character information of a few words (high-quality beneficial information, unexpected pleasant information, or the like) on the line of the "station" to be guided.

Moreover, in the application service, a media corner may be provided separately from the representative screen. The media corner is a corner that introduces stations all over the world and all over the country in a list form as an aggregate of links displaying only station names and links associating station names with articles covering the station and surrounding streets. Then, in the media corner, when a list of links in which only station names are displayed and links in which station names are associated with articles covering the stations and surrounding streets are generated, a function of displaying a station to which information with higher freshness is associated at a higher level or displaying only those with freshness higher than a certain reference may be included. Note that, in order to make it recognizable that the station is picked up on the media corner side, an identifier indicating that the station is also posted on the media corner may be displayed in a small character portion on the right side of the frame of each level of FIG. 3A on the representative screen.

Note that, since the display method of the media corner basically has a configuration similar to that of the representative screen, a picture of a scenery of a sightseeing spot around the station or a dish of a restaurant around the station corresponding to the station displayed to be selected, and character information of a few words (high-quality beneficial information, unexpected pleasant information, or the like) may be presented together. For example, it may be displayed in a portion corresponding to a small character portion on the right side of the frame of each level in FIG. 3A of the representative screen. The picture of a scenery or a dish and the character information of a few words may be used as statistical information of the frequency of selection by the user together with information indicating whether or not there is a tendency to be selected as a user population of the application service later and transmitted from the server 11 to the client device 10, and may be used as information for presenting an appropriate display in the client device 10. With this system, more attractive station information can be provided to many users. The small characters on the right side of the frames of respective levels are basically described by a company that operates the media corner, or a company, a municipality, or the like that provides information or funds to an application service.

Next, a case where the presented or retrieved station is selected by the client device 10 will be described.

A single station or a plurality of stations can be selected from the plurality of stations presented to the client device 10. When selected, as an information category with one selected station as a starting point, traffic information such as a timetable, transfer guidance, a map, and mobility (bus, taxi, car sharing, rental car, bicycle rental, motorcycle rental, or the like) related to the station, facility information of sightseeing, eating-out (gourmet), shopping, real estate, medical care, education, accommodation, and the like of the station and around the station, event information of the station and around the station, and further, a congestion degree, a tourism article, word-of-mouth, regional news, and municipality information, and facility information and event information desired to be guided by a company, a municipality, and the like that provide information and funds to the application service, and the like, are presented by each item.

FIG. 3B illustrates a display example illustrated when ΔΔΔ station is selected, for example. Since there are several candidates for specific information in every information category with one selected station as a starting point, several candidates for specific information are presented for each selected category (for example, in FIG. 3B, when "gourmet" is selected, candidates for specific information in the gourmet category are presented). The presentation order of some candidates for specific information may be presented according to the number of times selected in the user population of the application service, the amount of funds provided by a company, a municipality, or the like that provides information or funds to the application service for guiding to an event or information, the presence or absence of a bookmark memo with evaluation (one that can identify "I want to read it later", "I'm curious", "visited", or the like, five-level evaluation, or the like) to be described later, or an evaluation score. Furthermore, information of a few words corresponding to the item displayed to be selected (high-quality beneficial information, unexpected pleasant information, or the like) may also be presented.

In addition, for example, when "transportation" is selected in FIG. 3B, traffic/movement-related information starting from the station centered on railway-related information of the selected station is further presented. For example, transfer guidance and operation information of the station, a timetable of each route using the station, a transfer route search (if it is a device that provides the position information, which of the departure station and the arrival station it is may be automatically detected) using the station as a departure station or an arrival station, and a map around the station are presented. In addition, mobility (bus, taxi, car sharing, rental car, bicycle rental, motorcycle rental, or the like) may also be presented at the same time as the related information.

On the other hand, although illustrated as "medical care" in FIG. 3B, when a category related to facility information at a station and around the station is selected, a link to facility information with high utility value related to a station yard or streets around the station is presented.

Furthermore, although not displayed in FIG. 3B, if a category such as "event", "tourism article", "word-of-mouth", "area news", or "municipality information" is selected here, a reading article worth reading or a link to related information having high utility value regarding a station or streets around the station is presented. It may be possible to select real-time information by a comment regarding a station or streets around the station in an SNS, a tweet, or the like, an image, a video post, or the like.

A configuration of a database (DB) configured by the server 11 and the client device 10 for displaying FIGS. 3A, 3B, and 3C will be described later with reference to FIG. 5.

Note that, as a method of separating information categories or an expression method on the user interface in FIG. 3B, all categories may be arranged in one hierarchy, or after folders and tabs are separated by broad categories, such as "traffic/movement-related information", "facility information by genre around a station", "reading article", "picture/moving image", and "tweet", small categories may be arranged therein. The configuration of the database (DB) configured by the server 11 and the client device 10 that have this configuration will be described later with reference to FIG. 6. Using a display setting function in the application service, a display order of these categories may be rearranged or the selected category may be hidden on the basis of determination of the user.

Next, a description will be given regarding presentation in a case of a selected single station or plurality of stations and selecting one from candidates of a plurality of pieces of specific information displayed in each of traffic information such as a timetable, transfer guidance, a map, and mobility (bus, taxi, car sharing, rental car, bicycle rental, motorcycle rental, or the like) related to the station, facility information of sightseeing, eating-out (gourmet), shopping, real estate, medical care, education, accommodation, and the like of the station and around the station, event information of the station and around the station, and further, a congestion degree, a tourism article, word-of-mouth, regional news, and municipality information, and facility information and event information desired to be guided by a company, a municipality, and the like that provides information and funds to the application service, and the like, which are information categories selected therefrom. FIG. 3C corresponds to this display screen. Here, a company, a store, an administrative agency, a web site of event information, a transfer guidance application, and the like, which are linked, are displayed by the selection in the upper frame. Note that, in general, a web site (not only a web site that is displayed statically but also a programmed web site whose display content is dynamically generated) on the Internet is displayed in the upper frame, and as the content displayed here, a unique mini-program stored in the memory 102 of the client device 10 and provided by an application service operator or a third party operator for the purpose of presenting some information related to a station and streets around the station may be operated within the frame, a document/image file may be displayed, or a video/audio file may be reproduced.

A lower frame in FIG. 3C is a menu field, in which a home button for returning to an initial screen, a search button for transitioning to a station search screen, a button for attaching a bookmark memo with evaluation (one that can identify "I want to read it later", "I'm curious", "visited", or the like, five-level evaluation, or the like) to a reached web site or the like, a button for updating the displayed web site, and the like are displayed. Further, it is possible to have a function of inputting, as a comment, "high-quality beneficial information" that can correspond to an impression on the displayed web site or unexpected pleasant information, and a function of inputting information such as a keyword for enhancing searchability to the web site. Furthermore, the comment also has a function of enabling evaluation input by providing evaluation axes such as five-level evaluation, "like!", and "I want to eat!". Information registered by the user is information of a behavior history (log) or data of a preference (latent demand), and thus it is possible to control from the server 11 side for each individual or the entire user who uses the application service in such a manner that presentation of a station or specific information thereof on the application service is ranked high depending on the amount of favorable content. The "bookmark memo with evaluation", the "comment", the "keyword", and the like associated with each web site described in detail in this paragraph are collectively referred to as "tag information", and the database (DB) stored in the memory 112 of the server 11 is updated depending on the tagged tag information. The update based on the tag information is also performed according to the flowchart of FIG. 2.

Furthermore, although not displayed in FIG. 3B, if a category such as "event", "tourism article", "word of mouth", "area news", "municipality information", or the like is selected here, a reading article worth reading or a link to related information having high utility value regarding a station or streets around the station is presented, and these pieces of specific information may have a function that not only an application service operator but also a stakeholder (a railway operator, a municipality of a station location, or the like) for the station can freely post a URL link or a home-made content (link to URL, free character entry, picture, video, or audio content).

Furthermore, a similar posting function as described above may be provided to the user of the application service. To specific information posted by a stakeholder for the station or a user, information (an account name or an account image) for identifying the poster and the posted date and time may be added.

Note that this posting function updates the database (DB) information stored in the memory 112 of the server 11 according to the flowchart of FIG. 2.

Furthermore, regarding the article to be displayed, the application service may have a function of acquiring the date and time when the article is last updated from HTML information or analogizing the date and time description around an article title and content of an article body, and displaying only information with high freshness, in order from the information with high freshness among information related to the station and the streets around the station, depending on the acquisition and analogy result.

In this manner, when the related information is presented with the station as a starting point, the application service operator, the stakeholder for the station, and "high-quality beneficial information" (generic term including both primary information such as a web site and secondary information such as evaluation and comment) registered by the user of the application service are provided in association with each other, so that the user of the application service can acquire the "high-quality beneficial information including the unexpected pleasant information".

However, in providing information regarding one station and streets around the station, in a case where an application service operator, a stakeholder regarding the station, a company, a municipality, and the like that provide information and funds, are registered as described above, it takes time and work cost to register "high-quality beneficial information" in all stations in the world and all over the country. On the other hand, in a case where information is automatically collected by web scraping or the like in order to save time and work costs, information, fake news, or the like captured due to a determination error by a scraping algorithm or artificial intelligence is included, and hence it cannot be said that the information is "high-quality beneficial information".

First, the information collected by web scraping or the like includes not only "high-quality beneficial information" but also miscellaneous information such as fake news. Therefore, in order to extract "high-quality beneficial information" while using a means having an effect of reducing time and work costs such as web scraping, it is necessary to extract beneficial information that is not a lie and that makes a user to whom information is presented want to go to a station and streets around the station.

Therefore, a method of extracting "high-quality beneficial information" from information automatically collected by web scraping or the like will be described as follows.

Figure 4:
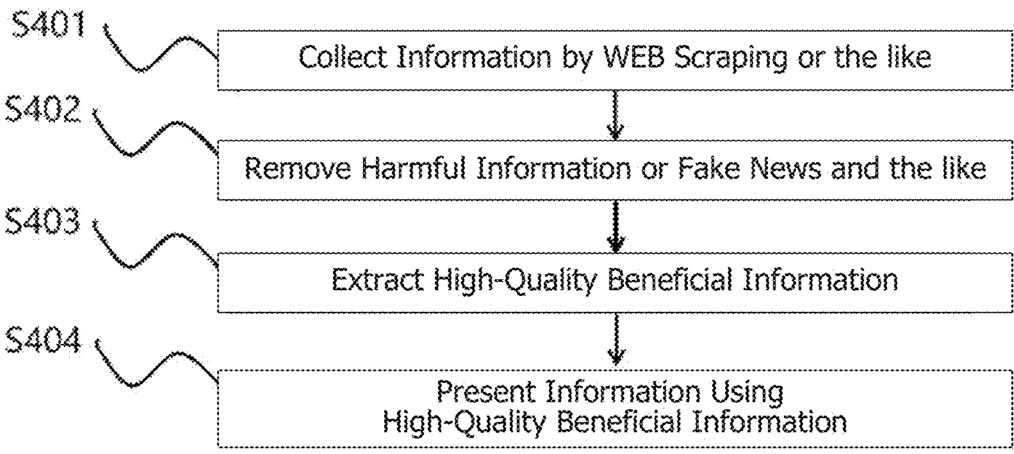
FIG. 4 is a flowchart for extracting "high-quality beneficial information" in the first embodiment.

FIG. 4 is a flowchart for extracting "high-quality beneficial information" in the first embodiment.

In step S401, the server 11 performs, for example, web scraping or the like, and automatically collects data and information. Not limited to the web scraping method, appropriate information may be automatically collected from any data set such as the entire Internet.

In step S402, the server 11 performs first filtering on collected data for removing harmful information or fake news or for preventing them from being used.

For example, at this time, an algorithm similar to the algorithm for blocking harmful web sites on the Internet is applied. In addition, it is possible to have a system in which information to be disclosed as information that is for all users and information that is not are identified by learning and determining a domain name of an address of an Internet web site and a URL, and a URL of non-public information such as personal online storage and non-public SNS post is not employed as information to be disclosed to the user of the application service.

This first filtering can also be applied to the posted URLs described above. This makes it possible to prevent posting of harmful web sites, fake news, and the like.

In step S403, "high-quality beneficial information" is extracted from information obtained by performing the first filtering processing on collected data of a web or the like. Details will be described below.

A specific group of employees of the application service operator, stakeholders for the station, local residents living in the city around the station, and the like evaluates the information obtained by performing the first filtering processing on collected data of a web or the like in a specific period. The evaluated information includes comments, impressions, explanations, and the like on the information subjected to the first filtering processing by a specific group including employees of the application service operator, stakeholders for the station, local residents living in the city around the station, and the like who are outsiders from the application service user. It is assumed that the "high-quality beneficial information" is equal to or more than a value evaluated in a specific period among the evaluated information.

As described above, a method for evaluation is performed by attaching a bookmark memo with evaluation (one that can identify "I want to read it later", "I'm curious", "visited", or the like, five-level evaluation, or the like) to the reached web site or the like. What kind of evaluation each member of a specific group gives to which content is scored and becomes an evaluation point. Further, this application service has an evaluation mode in which a specific group that evaluates a web site inputs before the web site is linked to a station and becomes available to all users. Furthermore, this application service has a function of inputting, to a displayed web site, a comment or the like which is an impression or unexpected pleasant outing information, similarly to a function of attaching a bookmark memo to a web site or the like. Then, by inputting evaluation, comments, and the like using these functions, information obtained by performing the first filtering processing on the collected data of a web or the like becomes evaluated information.

At this time, for example, when an evaluation, a comment, or the like is input on the evaluation mode of the application service, a hierarchy of "station", "information category", and "specific information such as a web site", a bookmark memo with evaluation (one that can identify "I want to read it later", "I'm curious", "visited", or the like, five-level evaluation, or the like), an input comment, or the like are registered in association with each other. In addition, this "comment or the like" also has a function of enabling evaluation input by providing evaluation axes such as five-level evaluation, "like!", and "I want to eat!" on the application service, and thus more detailed scoring is possible. In addition, similar evaluation may be performed using a management tool of an environment different from the application service itself.

The evaluation procedure described in detail in the preceding paragraph and the present paragraph is positioned as second filtering processing. The first filtering processing is performed by machine processing, but this second filtering processing is different in that it is processed by human power of a specific group. The first filtering processing by machine processing and the second filtering processing by human power are performed while "amount" of information is secured by collecting necessary information by web scraping or the like from a large amount of information scattered on the web site or the like, whereby "quality" of the information can also be secured.

In this manner, by associating the hierarchy of "station", "information category", and "specific information such as a web site" with the input comment or the like as the bookmark memo with evaluation (one that can identify "I want to read it later", "I'm curious", "visited", or the like, five-level evaluation, or the like), information evaluated as being equal to or more than the reference is "high-quality beneficial information", and for example, it is possible to influence the display order of stations in FIG. 3A or the display order in each information category in B to be higher.

To be equal to or more than a reference can be variously set. For example, as described above, it is possible to make settings such as processing of excluding two levels with lower scores after aggregation in the five-level evaluation among those to which one of the bookmark memo with evaluation (one that can identify "I want to read it later", "I'm curious", "visited", or the like, five-level evaluation, or the like) is added, or handling only those to which a certain ratio of "I'm curious" is added as being equal to or higher than the reference.

Note that, although the definition of the specific group is, in the above description, employees of the application service operator, stakeholders for the station, local residents living in the city around the station, and the like from the viewpoint of fairly evaluating information regarding facilities or events of the station or around the station, but for example, from the viewpoint of seeking a more fair evaluation, a user of an application service who has given a station attribute tag (closest to home, closest to work, desired to visit someday, favorite, or the like) to the station may be included.

By including users who have given station attribute tags to the station, it is possible to obtain evaluations from users who live around the station, work around the station, and live in areas other than the station and are interested in the station, while distinguishing evaluations from each other. In order to obtain an effect similar to this, there may be a system in which it is proved by position information that the user has visited the station a predetermined number of times or more, and the evaluation of the user satisfying this condition is distinguished from other users. In addition, it is also possible to emphasize evaluation of a user with high frequency depending on the use frequency of the application service. Furthermore, in a case where there are both a paid use version and a free use version of the application service, it is possible to secure more fair evaluation by emphasizing the evaluation of the paid user in a case where the evaluation of the free user is not fair.

Note that, in order to implement the above, it is possible to give the user who uses the application service the authority to browse and evaluate information regardless of whether or not information subjected to the first filtering processing from the collected data of a web or the like is equal to or more than a reference value. For example, the evaluation authority can be given depending on the use frequency of the application or only to paid users.

It is also possible to provide a function of posting a link, an article, or the like to a web site recommended by the user himself/herself to the user who is given the browsing and evaluation authority. A link, an article, or the like to a web site that has been recommended and posted has another evaluation criterion, and in a case where a certain number or more of users have posted a link, an article, or the like to the same web site, the link, the article, or the like can be evaluated to be equal to or more than the above reference. Thus, from the perspective of the application service operator side, "high-quality beneficial information" can be automatically obtained from information other than the information automatically collected by web scraping or the like. Note that this system may be provided not only to users who are authorized to browse and evaluate, but also to all users of the application service. In this case, until the number of users who post a link, an article, or the like to the same web site reaches a certain number or more, the post is treated as "post on the premise that only the user sees" for the user, and when the number of users reaches a certain number or more, the post is treated as "post recommended by many people".

The "unexpected pleasant information" included in the "high-quality beneficial information" is information that can be called an unexpected coincidental fortune "serendipity". It has been described above that a site or information evaluated by a specific group to a certain extent or more is preferentially displayed, or displayed depending on a past search history or selection history. In addition, by employing a user registration method for the application service, it is also possible to display information depending on the content of a personal attribute profile of user registration and liking/preference on the upper side of the display frame.

However, in the case of the above-described algorithm, since display is performed depending on the number of evaluations and the number of histories, information to be displayed is fixed in due course even if the initial level is fine, and the information is not necessarily information that can be continuously called "serendipity".

Further, when presenting a station or an article browsed by another user of the application service to the user, it is necessary to daringly present not only content having a relatively high possibility that the user surely likes but also content having a relatively low possibility that the user likes but also unexpected content to promote new discovery.

Accordingly, by setting a "specific period" to be a short period such as the latest one week or one month, among the information evaluated by the specific group to be equal to or more than a reference value in the specific period, the information can be specialized in the latest evaluated information, and thus the "serendipity" can be secured.

The process of narrowing down to the "specific period" is not a one-time process but is repeatedly executed.

Since this processing is automatically executed periodically also for existing content for the purpose of ensuring accuracy of information or maintaining freshness or preventing harmfulness due to aging, facility information or event information associated with a station and streets around the station is always updated or evaluated within a certain period of time and is high-quality information.

Note that how long the "specific period" is set can be set on the application service operator side or can be set by the user himself/herself, for example, depending on activation intervals of the application, a person who starts the application every day may set the constant period to about two weeks, and a person who starts the application once a week may set the specific period to about three months. Moreover, the history of activation intervals of the user may be stored on the side of the application service operator, and may be automatically determined and dynamically changed in view of the trend.

Furthermore, even if a site or an article is evaluated to be equal to or more than the reference value by a specific group, information is filtered according to the content of the personal attribute profile or liking/preference at the time of user registration, and thus, there is a possibility that a content other than a content with a specific liking/preference cannot be viewed. Accordingly, the content or the station other than the specific liking/preference may be randomly displayed together with the regular or every launch of the application. In addition, the display order may be randomly changed for those having a high evaluation value but a display order that is not high, even in a specific liking/preference range.

In addition, although it is described as random in the above description, in short, it is sufficient that content of different contents is displayed for the same station or the same information category every time the application service is started up, and thus, it may be enabled to sequentially display different contents each time the application service is started up with respect to contents of which the display order is not higher and which are equal to or more than the reference value, or display contents of which the display order is not higher with a certain regularity.

In addition, a history of web sites or articles evaluated to be equal to or more than the reference value and displayed for each user may be stored on the server 11 side or the client device 10 side, whereby it may be set that the same web sites or articles are not displayed and it may be set that candidates in the past are not displayed, and when there is no web site or article not displayed in units of a specific station, a specific information category, or the like, or no web site or article evaluated to be equal to or more than the reference value, the setting of not displaying may be reset once.

In step S404, the extracted high-quality beneficial information is held in the memory 112 of the server 11 in FIG. 1 as an object to be displayed on the client device 10. In response to the request from the client device 10, the server 11 transmits high-quality beneficial information according to the request and causes the client device 10 to present the information. The information that has not been extracted in step S403 may also be held in the memory 112 of the server 11 in FIG. 1, and in a case where evaluation is added by a posting function such as evaluation and comment of the user, and the evaluation is equal to or greater than a reference value of high-quality beneficial information, the information may be added as an object to be displayed.

An identifier indicating that the high-quality beneficial information exists or the high-quality beneficial information itself corresponds to display in a portion of small characters on the right side of the station display in FIG. 3A, the right side of the column of each information category in FIG. 3B, or a portion of small characters on the right side of the column of specific information in each information category.

On the right side of the level of specific information in each information category, it is possible to present a comment having the highest evaluation among comments and the like directly input by a specific group including users of the application service, employees of the application service operator, stakeholders for the station, local residents living in the city around the station, and the like. In this manner, the presence of high-quality beneficial information and unexpected pleasant information is conveyed to the user and displayed.

Furthermore, the above-described method for displaying high-quality beneficial information (generic term including both primary information such as a web site and secondary information such as evaluation and comment) may be similarly applied to the above-described media corner.

For this display method, a setting item related to the display method may be provided on the setting screen on the application side.

As a common function, a specific station or information category can be fixed by favorites.

For example, three pieces of specific information are displayed in “gourmet” in FIG. 3B in which, for example, the top may display a favorite, the center may display one having “high-quality beneficial information” and has the highest evaluation value calculated for comparison with the reference value, and the bottom may display “high-quality beneficial information” and does not have the highest evaluation value for comparison with the reference value, but display candidates that have equal to or more than the reference value randomly or with some regularity.

Furthermore, it is also possible to set, among the display settings, items such as how many candidates are displayed in the first place, how many favorites are displayed at a time, how many items are displayed in descending order of evaluation values, and how many items corresponding to “serendipity” which is “unexpected pleasant information” are displayed.

The contents of the above-described database (DB) are illustrated in the drawings. FIG. 5 illustrates an example of a structure of a database (DB) in the first embodiment. The upper side is an aggregation side of the database (DB) on the server 11 side, and the lower side is information in the database (DB) of each individual.

For information of the upper side, information remaining up to step S403 of the flowchart for extracting “high-quality beneficial information” performed in FIG. 4 is registered as information classified into the following classification. In addition, information that has passed the first filtering in step S402 in FIG. 4 is also registered after being classified and posted by the user for each station and information category.

The lower side is not necessarily required to be on the server 11 side, and may be managed on the client device 10 side. Furthermore, the lower side is not necessarily constructed in a complete form, and the database may be sequentially and partially constructed using the access of the client device 10 to the server 11.

In both the upper side and the lower side, the left column is station attribute tags (closest to home, closest to work, desired to visit someday, favorite, or the like) associated with each station and the station.

In the middle column, there are traffic information such as a timetable, transfer guidance, a map, and mobility (bus, taxi, car sharing, rental car, bicycle rental, motorcycle rental, or the like) related to the station, facility information of sightseeing, eating-out (gourmet), shopping, real estate, medical care, education, accommodation, and the like of the station and around the station, event information of the station and around the station, and further, a congestion degree, a tourism article, word-of-mouth, regional news, and municipality information, and facility information and event information desired to be guided by a company, a municipality, and the like that provide information and funds to the application service, and the like, which are information categories with one selected station as a starting point.

The right column is a URL for each of the plurality of pieces of specific information displayed in each of the information categories in the middle column described above, and tag information associated with the URL (generic name of “bookmark memo with evaluation”, “comment”, “keyword”, and the like).

A difference between the upper side and the lower side is that station attribute tag information of an individual and tag information associated with a URL (generic name such as “bookmark memo with evaluation”, “comment”, and “keyword”) are registered on the lower side, whereas station attribute tag information in which a number registered by an individual is aggregated in the entire application service and tag information associated with a URL are registered on the upper side.

For example, regarding the station attribute tag information (closest to home, closest to work, desired to visit someday, favorite, or the like) in the left column, information registered by an individual on each client device 10 side is reflected on the lower side, and aggregation information of information registered by each individual is reflected on the upper side. In the tag information associated with the URL in the right column, the information registered by an individual on each client device 10 side is reflected on the lower side, and aggregation information of information registered by each individual is reflected on the upper side.

With such a structure of the database (DB), the above-described service can be performed.

Further, FIG. 6 is another example of the database structure in the first embodiment. As a method of dividing the information categories and an expression method on the user interface, categories may be arranged in one hierarchy such as event information—○○, event information—ΔΔ, and municipality information—□□, or small categories may be arranged therein after folders and tabs are divided into broad categories such as “traffic/movement-related information” and “facility information by genre around station”.

Note that FIG. 6 illustrates only the database (DB) on the server 11 side, but there is also a database (DB) on the client device 10 side as in the case of FIG. 5.

According to the above embodiment, the information processing system according to the present disclosure includes:

the server 11 to output, when information of a station is received, traffic information including time information related to the station and facility information or event information related to the station or a periphery of the station; and the client device 10 to output information of the station to the server 11 and present traffic information including received time information related to the station, and facility information or event information related to the station or a periphery of the station, the traffic information including the time information related to the station and facility information or event information related to the station or a periphery of the station can be presented.

The traffic information including the time information related to the station includes a service related to mobility, and the facility information or the event information related to the station or a periphery of the station also includes word-of-mouth information, news information, or article information, more satisfactory information can be presented with the station as a starting point.

The facility information or the event information related to the station or a periphery of the station is information obtained by filtering harmful or fake information included in automatically collected information, and is information evaluated in association with facility information or event information related to the station or a periphery of the station by a specific group including outsiders, and thus it is possible to reduce the harmful or fake information while quickly constructing the database (DB).

When presenting information that satisfies a presentation request for facility information or event information related to the station or a periphery of the station from among pieces of high-quality beneficial information evaluated to be equal to or more than a predetermined reference among the evaluated information, the client device 10 presents a candidate different from a candidate presented in a previous request, and thus it is possible to continue to provide unexpected information while securing the quality of the information.

In addition, the high-quality beneficial information is information generated in a certain period and is information that is updated, it is possible to continue providing unexpected information while securing more quality of information.

Since the high-quality beneficial information also includes information posted by the user using the client device 10, it is possible to ensure quality of information although it is a user participation type, and to continue providing unexpected information.

When presenting a candidate different from the candidate presented in the previous request, the client device 10 determines a candidate to be presented this time at random or using a predetermined rule from among pieces of the high-quality information, and can continue to provide more unexpected information while securing quality of information.

When presenting a candidate different from the candidate presented in the previous request, the client device 10 excludes a candidate displayed in a past from candidates to be presented this time, and can thereby continue to provide more unexpected information while securing quality of information.

The client device 10 presents at least one or more stations registered and managed by the user, and thus it is possible to achieve both provision of unexpectedness and information actually desired by the user.

Furthermore, at least one or more stations registered and managed by the user can have one or more positions of stations set as attribute tags for the user, and thus the user can organize a list of stations in an easy-to-understand manner depending on positions of the stations for the user.

The client device 10 presents a plurality of station candidates to receive station information, and the plurality of station candidates is presented depending on the position where the client device is used, and since the information is presented depending on a time required for a route transfer search, it is possible to achieve both provision of more unexpectedness and information actually desired by the user.

REFERENCE SIGNS LIST

10: client device, 11: server, 101: communication interface, 102: memory, 103: processor, 104: input/output interface, 111: communication interface, 112: memory, 113: processor

The invention claimed is:

1. An information processing system comprising:

a server to output, when information of a station is received, traffic information including time information related to the station and facility information or event information related to the station or a periphery of the station; and a client device to output the information of the station to the server and present the traffic information including received time information related to the station, and the facility information or the event information related to the station or the periphery of the station, wherein the server performs a first filtering process to filter harmful or fake information included in automatically collected information through the facility information or the event information related to the station or the periphery of the station to generate filtered information, wherein the server further performs a second filtering process on the filtered information to extract information evaluated based on evaluation inputs received by the server in association with the facility information or the event information related to the station or the periphery of the station from a specific group including an employee of an operator of the server, a stakeholder of the station, or a local resident of the periphery of the station, and wherein when the client device presents information that satisfies a presentation request for the facility information or the event information related to the station or the periphery of the station, the server extracts candidates for specific information from among the information extracted by the second filtering process that are evaluated to be equal to or more than a predetermined reference in a predetermined period, the extracted candidates for specific information being evaluated to be equal to or more than the predetermined reference in a shorter period than the predetermined period, and the server excludes a candidate from the extracted candidates for specific information displayed in a past, determines a candidate different from the candidate presented in a previous request, and transmits the determined candidate to the client device.

2. The information processing system according to claim 1, wherein:

the traffic information including the time information related to the station includes a service related to mobility, and the facility information or the event information related to the station or the periphery of the station also includes word-of-mouth information, news information, or article information.

3. The information processing system according to claim 1, wherein:

the server provides the information extracted by the second filtering process that is information generated in a certain period and is updated.

4. The information processing system according to claim 1, wherein;

the server provides the information extracted by the second filtering process that also includes information posted by a user using the client device.

5. The information processing system according to claim 1, wherein:

when presenting a candidate for specific information different from the candidate presented in the previous request, the server determines a candidate to be presented this time at random or using a predetermined rule from among pieces of the information extracted by the second filtering process.

6. The information processing system according to claim 1, wherein;

the server presents to the client device at least one or more stations managed by the server or the client device registered by a user.

7. The information processing system according to claim 6, wherein:

in at least one or more stations managed by the server or the client device, it is possible to set one or more positioning of the station for the user as an attribute tag.

8. The information processing system according to claim 1, wherein;

the client device presents a plurality of station candidates to receive the station information, and the plurality of station candidates is presented depending on a position where the client device is used.

9. The information processing system according to claim 8, wherein:

the plurality of station candidates presented depending on the position where the client device is used is presented depending on a required time required in a route transfer search.

10. The information processing system according to claim 1, wherein:

the specific group further includes a paid user of the client device, a user who has visited the station a predetermined number of times, or a user who has assigned a station attribute tag to the station.

11. The information processing system according to claim 10, wherein:

the client device receives a user input from the user to register the station and assign the station attribute tag to the registered station, the station attribute tag indicating attributes including an indication of desire to visit someday or a favorite.

12. The information processing system according to claim 10, wherein:

the client device receives a user input from the user to register the station and assign the station attribute tag to the registered station, the station attribute tag indicating attributes including a user-defined positional relationship between the user and the station, a home positional relationship between the station and a home of the user, or a work positional relationship between the station and a workplace of the user.

13. The information processing system according to claim 1, wherein:

the evaluation inputs received from the specific group include at least one of a bookmark memo with evaluation, a comment, or a keyword.

14. The information processing system according to claim 13, wherein:

the bookmark memo with evaluation includes an identifier indicating a user intention, and the identifier indicating the user intention includes an indication to read it later, a curious indication, or a visited indication.

15. The information processing system according to claim 13, wherein:

the evaluation inputs include an evaluation axis for providing a score, and the evaluation axis includes a five-level evaluation score, a like indication, or a want-to-eat indication.

16. The information processing system according to claim 1, wherein:

the client device displays a selected candidate from the traffic information, the facility information, or the event information in an upper frame of a display screen, wherein content displayed in the upper frame includes a web site, a document or image file, a reproduced video or audio file, or an operation of a program stored in a memory of the client device.

17. The information processing system according to claim 1, wherein:

the client device displays the candidates for specific information in a list including:

a first candidate registered as a favorite by a user, displayed on a top of the list;

a second candidate having a highest evaluation value among the candidates, displayed in a center of the list; and a third candidate displayed at a bottom of the list, the third candidate has an evaluation value equal to or more than the predetermined reference but lower than the highest evaluation value, and is selected randomly to display unexpected pleasant information.

18. The information processing system according to claim 1, wherein:

the client device collects position information, and the server automatically designates the station as a departure station or an arrival station for a route transfer search based on the position information.

19. An information processing method comprising:

outputting, by a server, when information of a station is received, traffic information including time information related to the station and facility information or event information related to the station or a periphery of the station;

presenting, by a client device, the traffic information including received time information related to the station, and the facility information or the event information related to the station or the periphery of the station;

performing, by the server, a first filtering process to filter harmful or fake information included in automatically collected information through the facility information or the event information related to the station or the periphery of the station to generate filtered information;

performing, by the server, a second filtering process on the filtered information to extract information evaluated based on evaluation inputs received by the server in association with the facility information or the event information related to the station or the periphery of the station from a specific group including an employee of an operator of the server, a stakeholder of the station, or a local resident of the periphery of the station;

extracting, by the server, candidates for specific information from among the information extracted by the second filtering process that are evaluated to be equal to or more than a predetermined reference in a predetermined period, the extracted candidates for specific information being evaluated to be equal to or more than the predetermined reference in a shorter period than the predetermined period, when the client device presents information that satisfies a presentation request for the facility information or the event information related to the station or the periphery of the station; and excluding, by the server, a candidate from the extracted candidates for specific information displayed in a past, determining, by the server a candidate different from the candidate presented in a previous request, and transmitting, by the server, the determined candidate to the client device.

20. A server comprising:

a memory storing instructions; and a processor configured to execute the instructions to:

output, when information of a station is received, traffic information including time information related to the station and facility information or event information related to the station or a periphery of the station;

perform a first filtering process to filter harmful or fake information included in automatically collected information through the facility information or the event information related to the station or the periphery of the station to generate filtered information:

perform a second filtering process on the filtered information to extract information evaluated based on evaluation inputs received by the server in association with the facility information or the event information related to the station or the periphery of the station from a specific group including an employee of an operator of the server. a stakeholder of the station, or a local resident of the periphery of the station, and wherein when a client device presents information that satisfies a presentation request for the facility information or the event information related to the station or the periphery of the station, the server extracts candidates for specific information from among the information extracted by the second filtering process that are evaluated to be equal to or more than a predetermined reference in a predetermined period, the extracted candidates for specific information being evaluated to be equal to or more than the predetermined reference in a shorter period than the predetermined period, and the server excludes a candidate from the extracted candidates for specific information displayed in a past, determines a candidate different from the candidate presented in a previous request, and transmits the determined candidate to the client device.

* * * * *